Ⅰ US008782385B2

(12) United States Patent
Dennis et al.

(10) Patent No.: US 8,782,385 B2
(45) Date of Patent: Jul. 15, 2014

(54) SYSTEM AND METHOD OF ENABLING USE OF SOFTWARE APPLICATIONS USING STORED SOFTWARE LICENSING INFORMATION

(75) Inventors: Lowell Dennis, Pflugerville, TX (US); Don McCall, Cedar Park, TX (US); Margaret Franco, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 1972 days.

(21) Appl. No.: 11/735,756

(22) Filed: Apr. 16, 2007

(65) Prior Publication Data

US 2008/0256349 A1 Oct. 16, 2008

(51) Int. Cl.
*G06F 15/177* (2006.01)
*G06F 21/12* (2013.01)

(52) U.S. Cl.
CPC ............ *G06F 21/121* (2013.01); *G06F 21/123* (2013.01); *G06F 21/128* (2013.01)
USPC .................................................. 713/1; 713/2

(58) Field of Classification Search
CPC ........................................ G06F 21/121–21/128
USPC .............. 726/9, 26, 27, 28, 29; 713/224, 201, 713/212, 213, 220, 223; 380/200, 201, 202, 380/203, 277; 709/204, 201, 220, 227
See application file for complete search history.

(56) References Cited

U.S. PATENT DOCUMENTS

| 2005/0004873 A1* | 1/2005 | Pou et al. ................. 705/51 |
| 2005/0289072 A1* | 12/2005 | Sabharwal ............... 705/59 |
| 2006/0288422 A1* | 12/2006 | Liu et al. ................. 726/26 |

* cited by examiner

*Primary Examiner* — Jeffrey Pwu
*Assistant Examiner* — Nega Woldemariam
(74) *Attorney, Agent, or Firm* — Larson Newman, LLP

(57) ABSTRACT

A system and method of enabling use of software applications using stored software licensing information is disclosed. In one form, a method of enabling use of a software application is disclosed. The method can include accessing a first software licensing information of a first software application within a non-volatile memory of an information handling system. The first licensing information can be stored in association with an order fulfillment process. The method can also include executing an initialization routine in association with a BIOS of the information handling system. In one form, the initialization routine can be operable to initiate accessing the software licensing information from the non-volatile memory to enable use of the first software application.

19 Claims, 5 Drawing Sheets

SYSTEM AND METHOD OF ENABLING USE OF SOFTWARE APPLICATIONS USING STORED SOFTWARE LICENSING INFORMATION

FIELD OF THE DISCLOSURE

This disclosure relates generally to information handling systems, and more particularly to a system and method of using a software application using stored software licensing information.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can be configured to use a variety of hardware and software components that can be configured to process, store, and communicate information and can include one or more computer systems, data storage systems, and networking systems.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

Figure 1:
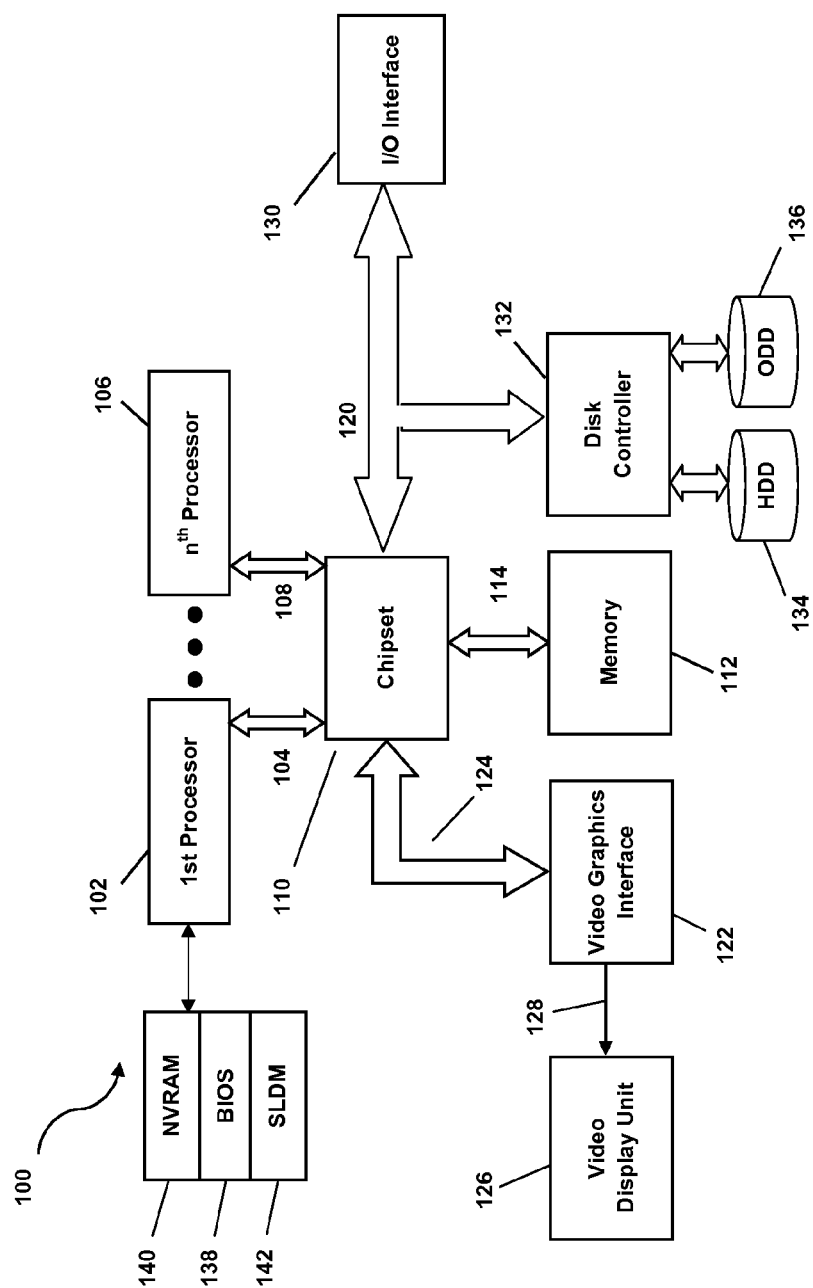
FIG. 1 illustrates a block diagram of an information handling system according to one aspect of the disclosure.

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application. The teachings can also be utilized in other applications and with several different types of architectures such as distributed computing architectures, client/server architectures, or middleware server architectures and associated components.

For purposes of this disclosure, an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a PDA, a consumer electronic device, a wireless communication device, a thin client, a diskless computer system or personal computer (PC) a network server or storage device, a switch router, wireless router, or other network communication device, or any other suitable device and can vary in size, shape, performance, functionality, and price. The information handling system can include memory, one or more processing resources such as one or more single or multiple-core central processing units (CPUs) or hardware or software control logic. Additional components of the information handling system can include one or more storage devices, one or more communications ports for communicating with external devices as well as various input and output (I/O) devices, such as a keyboard, a mouse, and a video display. The information handling system can also include one or more buses operable to transmit communications between the various hardware components.

According to one aspect of the disclosure, a method of enabling use of a software application is disclosed. The method can include enabling access to a first software licensing information of a first software application within a non-volatile memory of an information handling system. The first licensing information can be stored in association with an order fulfillment process. The method can also include storing an initialization routine in association with a BIOS of the information handling system. In one form, the initialization routine can be operable to initiate accessing the software licensing information from the non-volatile memory to enable use of the first software application.

According to another aspect of the disclosure, an information handling system can include a non-volatile memory device storing a software licensing information in response to a user ordering a first software application using an on-line user interface. The information handling system can also include an initialization routine operable to access the non-volatile memory device during a system initialization. In one form, the initialization routine can be further operable to initiate a verification of the first licensing information to enable access to the first software application.

According to a further aspect of the disclosure, a software management system is disclosed. The software management system can include an on-line user interface operable to enable a user to select a first software application to order. The software management system can further include a software management licensing engine operable to receive a request to enable access to the first software application ordered using the on-line user interface. In one form, access can be enabled by initiating a loading into a non-volatile memory of an information handling system a first software licensing information of the first software application.

FIG. 1 illustrates a block diagram of an exemplary embodiment of an information handling system, generally designated at 100. In one form, the information handling system 100 can be a computer system such as a server. As shown in FIG. 1, the information handling system 100 can include a first physical processor 102 coupled to a first host bus 104 and can further include additional processors generally designated as $n^{th}$ physical processor 106 coupled to a second host bus 108. The first physical processor 102 can be coupled to a chipset 110 via the first host bus 104. Further, the $n^{th}$ physical processor 106 can be coupled to the chipset 110 via the second host bus 108. The chipset 110 can support multiple processors and can allow for simultaneous processing of multiple processors and support the exchange of information within information handling system 100 during multiple processing operations.

According to one aspect, the chipset 110 can be referred to as a memory hub or a memory controller. For example, the chipset 110 can include a dedicated bus to transfer data between first physical processor 102 and the $n^{th}$ physical processor 106. For example, the chipset 110 including a chipset that can include a memory controller hub and an input/output (I/O) controller hub. As a memory controller hub, the chipset 110 can function to access the first physical processor 102 using first bus 104 and the $n^{th}$ physical processor 106 using the second host bus 108. The chipset 110 can also be used as a memory interface for accessing memory 112 using a memory bus 114. In a particular embodiment, the buses 104, 108, and 114 can be individual buses or part of the same bus. The chipset 110 can also include bus control and can handle transfers between the buses 104, 108, and 114.

According to another aspect, the chipset 110 can include an application specific chipset that connects to various buses, and integrates other system functions. For example, the chipset 110 can include using an Intel® Hub Architecture (IHA) chipset that can also include two parts, a Graphics and AGP Memory Controller Hub (GMCH) and an I/O Controller Hub (ICH). For example, an Intel 820E, an 815E chipset, an Intel 975X chipset, an Intel G965 chipset, available from the Intel Corporation of Santa Clara, Calif., or any combination thereof, can be used as at least a portion of the chipset 110. The chipset 110 can also be packaged as an application specific integrated circuit (ASIC).

In one form, the chipset 110 can be coupled to a video graphics interface 122 using a third bus 124. In one form, the video graphics interface 122 can be a Peripheral Component Interconnect (PCI) Express interface operable to content to display within a video display unit 126. Other graphics interfaces may also be used. The video graphics interface 122 can output a video display output 128 to the video display unit 126. The video display unit 126 can include one or more types of video displays such as a flat panel display (FPD), cathode ray tube display (CRT) or other type of display device.

The information handling system 100 can also include an I/O interface 130 that can be connected via an I/O bus 120 to the chipset 110. The I/O interface 130 and I/O bus 120 can include industry standard buses or proprietary buses and respective interfaces or controllers. For example, the I/O bus 120 can also include a PCI bus or a high speed PCI-Express bus. In one embodiment, a PCI bus can be operated at approximately 66 MHz and a PCI-Express bus can be operated at more than one (1) speed (e.g. 2.5 GHz and 5 GHz). PCI buses and PCI-Express buses can comply with industry standards for connecting and communicating between various PCI-enabled hardware devices. Other buses can also be used in association with, or independent of, the I/O bus 120 including, but not limited to, industry standard buses or proprietary buses, such as Industry Standard Architecture (ISA), Small Computer Serial Interface (SCSI), Inter-Integrated Circuit ($I^2C$), System Packet Interface (SPI), or Universal Serial buses (USBs).

In an alternate embodiment, the chipset 110 can be a chipset employing a Northbridge/Southbridge chipset configuration (not illustrated). For example, a Northbridge portion of the chipset 110 can communicate with the first physical processor 102 and can control interaction with the memory 112, the I/O bus 120 that can be operable as a PCI bus, and activities for the video graphics interface 122. The Northbridge portion can also communicate with the first physical processor 102 using first bus 104 and the second bus 108 coupled to the $n^{th}$ physical processor 106. The chipset 110 can also include a Southbridge portion (not illustrated) of the chipset 110 and can handle I/O functions of the chipset 110. The Southbridge portion can manage the basic forms of I/O such as Universal Serial Bus (USB), serial I/O, audio outputs, Integrated Drive Electronics (IDE), and ISA I/O for the information handling system 100.

The information handling system 100 can further include a disk controller 132 coupled to the I/O bus 120, and connecting one or more internal, external, or remote disk drives such illustrated generally as a hard disk drive (HDD) 134 and an optical disk drive (ODD) 136 such as a Read/Write Compact Disk (R/W CD), a Read/Write Digital Video Disk (R/W DVD), a Read/Write mini-Digital Video Disk (R/W mini-DVD), or other type of optical disk drive. In one form, the HDD 134 can be remotely located and access via a network.

In one form, the information handling system 100 can include a basic input output system (BIOS) 138 stored within a non-volatile random access memory (NVAM) 140 that can include a FLASH memory device or any other form of non-volatile memory accessible by the information handling system 100 during an initialization routine. In one form, persistent data such as licensing information or feature enablement information can be stored within the NVRAM 140 and access by the BIOS 138. The BIOS 138 can include or access a software license detection module (SLDM) 142 operable to detect software license information available to enable use of one or more specific software applications of the information handling system 100. In one form, the SLDM 142 can be a part of the BIOS 138, or may be stored within a separate memory location that can be accessed by the BIOS 138 during an initialization of the information handling system 100. According to a further aspect, the software licensing information can include licensing keys, a string of characters, a flag, an encoded value, an encrypted value, or any other type of licensing or other verification information that can be stored within a memory device and accessed during an initialization routine or request to access an application. In one form, the licensing information can be located within a memory device on a main circuit board, such as a motherboard, baseboard, Trusted Platform Module (TPM), etc. (not illustrated) of the information handling system 100 and accessible by the BIOS 138 during initialization.

According to another aspect, the information handling system 100 can be a "diskless" information handling system. For example, the information handling system 100 may not include software applications such as media applications, business applications, word processing applications, Internet browser applications, etc. that may be traditionally stored on a hard drive, flash drive, optical drive, tape drive, etc. and configured to be locally access by the information handling system 100. More particularly, the disk controller 132, the HDD 134, the ODD 136 in FIG. 1 may not be present. For example, the diskless information handling system can include sufficient memory resources to temporarily store remotely accessed software applications, and can access the software applications from one or more networked resource or remote location. The diskless system can download the applications during initialization, or as needed, and use licensing information of the diskless system to enable access.

In one embodiment, licensing information can be encoded based on a specific application having a validation or verification routine operable to receive the encoded information and enable access to the software application. For example, a software application can include a first encoded string provided as a part of the software application. The software licensing information can also include the first encoded string or a corresponding string or key that can be entered or input to the software application when initialized. The licensing information can then be used during an initialization of the software application and if the software licensing information matches or corresponds to the first encoded string included as a part of the software application, access may be enabled allowing a user to use the software application. Various other forms of validation can also be used. For example, the licensing information can be provided as a verification bit during an initialization routine. The verification bit can be stored within a memory of the information handling system and checked as the system is initialized, as the software application is accessed, or as desired. According to another aspect, licensing information can include various other forms including a licensing key, a digital certificate, or a challenge response authentication method.

Figure 2:
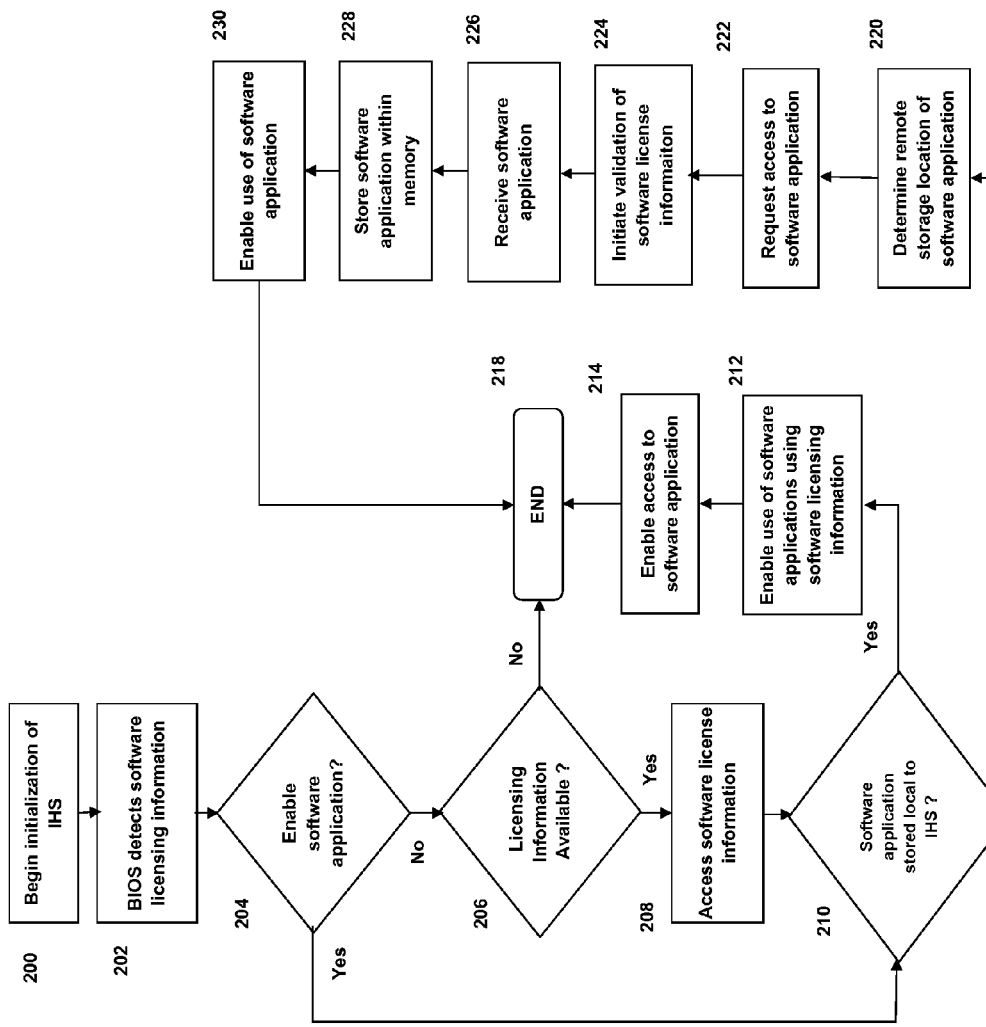
FIG. 2 illustrates a flow diagram of a method of enabling access to software using licensing information according to one aspect of the disclosure.

FIG. 2 illustrates a flow diagram of a method of enabling access to software using licensing information according to one aspect of the disclosure. FIG. 2 can be employed in whole, or in part, by the information handling system 100 depicted in FIG. 1, the management system 300 described in FIG. 3 below, or any other type of system, controller, device, module, processor, or any combination thereof, operable to employ all, or portions of, the method of FIG. 2. Additionally, the method can be embodied in various types of encoded logic including software, firmware, hardware, or other forms of digital storage mediums, computer readable mediums, or logic, or any combination thereof, operable to provide all, or portions of, the method of FIG. 2.

The method begins generally at block 200 when an initialization of an information handling system (IHS) is initiated. Initialization can include applying power to a system, booting a system, rebooting a system, reinitializing a system, or any other type of process that may institute initializing an information handling system. Upon initiating an initialization sequence, the method can proceed to block 202 and the system's BIOS can be used to detect one or more software licensing information to enable use of one or more software application. For example, an information handling system can include one or more software applications that have been loaded onto a system and can include software licensing information such as licensing keys, encrypted licensing data, a licensing bit, a licensing flag, a string of characters, or any other type of software licensing information stored within a memory of the IHS. In one form, the software licensing information can be stored within a programmable memory device or non-volatile memory device that was previously programmed to include the software licensing information. For example a non-volatile memory, such as ROM, PROM, EEPOROM, Flash memory device, or other type memory that can be accessed by a system's BIOS during an initialization routine and storing the software licensing information.

In one form, non-volatile memory device can be used within a main circuit board, motherboard, base board, etc., of an IHS and programmed by a manufacturer of the IHS in association with preloading software onto an IHS prior to distributing the IHS to the user. According to one aspect, the non-volatile memory can include a software enabling BIOS-entry that can be accessed only by a system's BIOS or an associated module during an initialization routine. The software enabling BIOS-entry can be stored at a specific address within the non-volatile memory and can include an encoded or encrypted information that can include portions or all of the software licensing information that can be used to enable use of a specific software application. In another form, the software enabling BIOS-entry can include an address or range of addresses that can store the software licensing information. In other forms, the software enabling BIOS-entry can include a reference to a module, application, routine, etc. operable to be employed by the IHS to initiate validation of the software licensing information. For example, a software licensing detection module can be initiated by the BIOS or an initialization routine to detect licensing information and, in one for, initiate validating or authenticating the licensing software information to a enable use of a software application. Software applications can include various types of applications, and in one form, can include operating systems, Virtual Machines (VMs), Virtual Machine Monitors (VMMs) associated components, modules, drivers, or any combination thereof.

In one form, a VMM application or VMM can be enabled and used by an IHS. For example, a VMM can be used as "base" operating system (OS) and can allow multiple other OS images to be installed on top of, or managed by, the VMM. The VMM application can include a reduced-sized application (e.g. a few megabytes) and can be booted from flash memory of the IHS. For example, the BIOS can boot during an initialization and subsequently the VMM can boot or initialize after, or in association with the BIOS boot. The BIOS can enable the VMM to boot using stored licensing information and during initialization, the stored license information of the VMM can be authenticated or recognized by the BIOS to determine if the VMM application should be employed. If the VMM is not licensed or authenticated, the BIOS would not allow the VMM to boot or initialize. In one form, a challenge response authentication from the VMM to the BIOS, and then from the BIOS to the VMM, can be used to enable the VMM application. In one form, if the VMM authorization or validation fails, execution of all OSs can be stopped or disabled. Additionally, if the VMM is authorized or enabled, one or the OSs can fail while one or more others can continue to be used. In this manner, a secure VMM can be employed by the IHS reducing unauthorized use of improperly installed VMMs thereby creating a secure operating environment to install one or more OSs.

In another form, a VM application or VM can be enabled and used by an IHS. For example, a VM can be used in association with a BIOS boot that loads a first OS. A VM application can then run on top of, or with the first OS, and allow or enable additional OSs to be loaded. In one form, VM license information can be validated or verified during a BIOS boot. A one-way licensing authentication can be used. However, in other forms, a two-way authentication can be employed so that an unauthorized OS image cannot be loaded as a valid OS. Additionally, if the first OS fails, each of the other OSs will halt and have to be re-booted and each VM, OS, or any combination thereof, may need to be re-authorized.

Upon detecting one or more software licensing information, the method can proceed to block 204 and determines if a software application has been enabled (e.g., software licensing information has been validated). For example, if one or more software applications have been enabled, the method can proceed to decision block 210 as described below. If at decision block 204, one or more software applications have not been enabled, the method can proceed to decision block 206 and determine if licensing information is available to authenticate or validate use. For example, a new software application or software update may have been loaded, or made available to be used by a system, since previously initialized. As such, if licensing information is not available, the method can proceed to block 218 and ends. In one form, at block 218, a user may be prompted to manually enter a license key or licensing information prior to a user accessing and using a software application.

If at decision block 206, licensing information is available, the method can proceed to block 208 and the licensing information stored within the IHS can be accessed. For example, the licensing information can be stored within a memory of the IHS and accessed or read. The method can then proceed to decision block 210 and determine if one or more software applications are stored local to the IHS. For example, an IHS can include a storage device, such as a HDD or other type of drive, operable to store software applications. In another embodiment, the IHS can be configured as a diskless IHS that accesses software applications at a remote location to download and use.

If at decision block 210, the software applications are stored local to the IHS, the method can proceed to block 212 and validate the software licensing information. For example, the software licensing information can be used in response to a request of the software application to input software licensing information prior to use of the software application. In another form, the software licensing information can include a bit or string of characters that can validate licensing of the software application prior to use. Upon validating one or more software licensing information, the method can proceed to block 214 and access to the software application can be enabled. The method can then proceed to block 218 where the method ends.

If at decision block 210, one or more software applications are not stored local to the IHS, the method can proceed to block 220 and determine a remote storage location of one or more software applications to be used. For example, one or more software applications can be stored within a server accessible by the IHS. The IHS can be configured to download the applications by accessing a network, such as an Intranet or the Internet. Access can be obtained using various types of networks, network speeds, and network topologies, including, but not limited to a high-speed networks such as a giga-bit Ethernet or fiber networks, wireless networks, low speed networks, or any combination thereof. The IHS can further include a network location, IP address, and the like, to access downloadable software applications to be used by the IHS. Upon determining a remote location, the method can proceed to block 222 and requests access to one or more software applications stored at the remote location. The method then proceeds to block 224 and validation of one or more software licensing information can be initiated. For example, software licensing information to be used to validate use of one or more software applications can be communicated to a remote location to authenticate access and use of one or more applications. Upon authenticating or validating the software licensing information, the method can proceed to block 226 and the remote location can distribute software to the IHS and the IHS can receive the software application via the network. The method can then proceed to block 228 and software downloaded from a remote location can be temporarily stored within a memory of the local IHS. The IHS can then execute the software application as desired at block 230. The method can then proceed to block 218 and end.

In one form, the method of FIG. 2 can be modified to validate more than one software license to enable access to more than one software application. In another form, the software licensing information may need to only be validated one time. For example, the software licensing information can be validated upon loading the software application, loading the software licensing information, loading a software update, downloading an application or license, or during various other activities. Additionally, the method illustrated in FIG. 2 can allow for local storage of persistent licensing information that can be accessed and used to access locally stored, or remote stored, software applications. In this manner, a user need not have to enter the licensing information to use the software application. Additional, efficient distribution and control of software applications can be realized.

Figure 3:
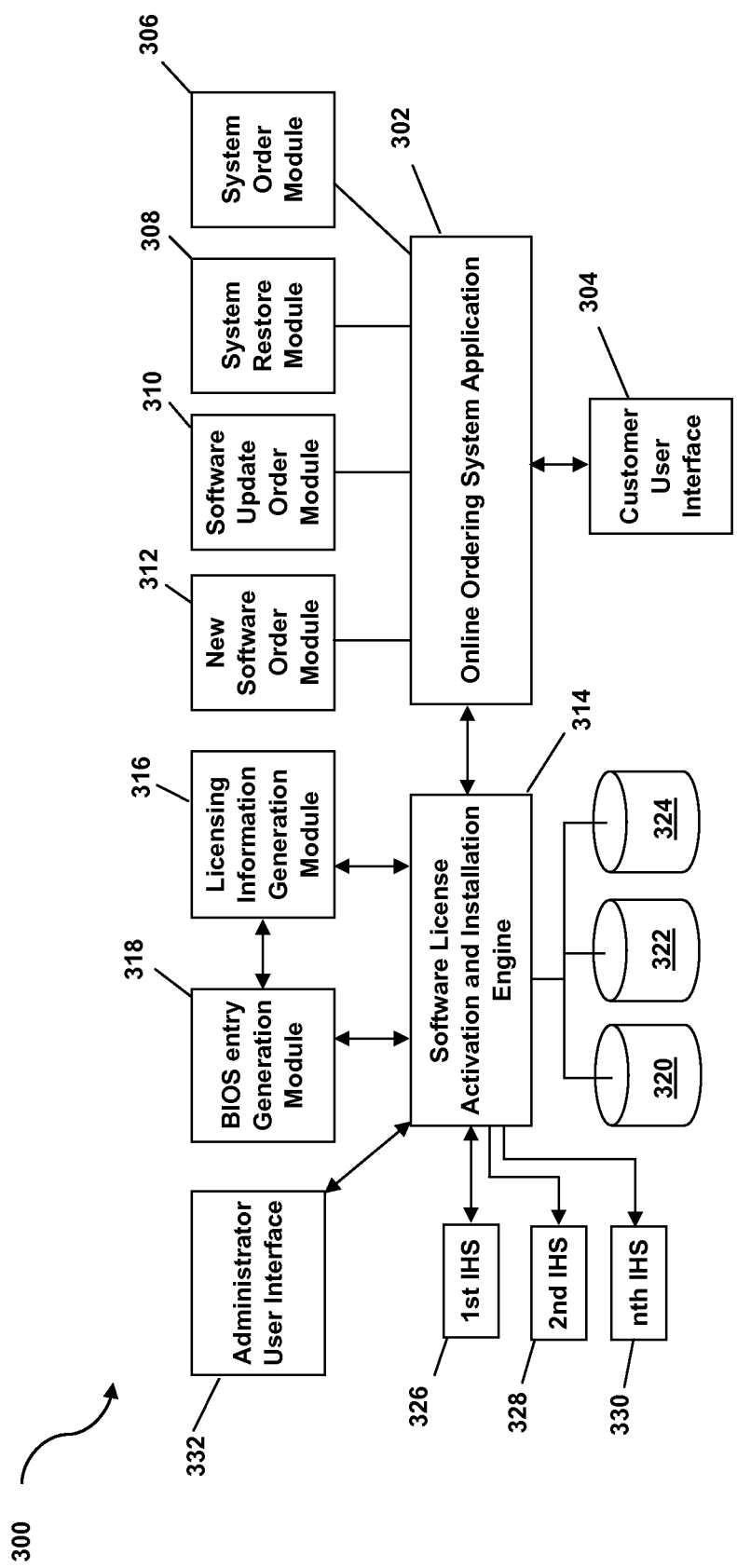
FIG. 3 illustrates a block diagram of a software license management system according to one aspect of the disclosure.

FIG. 3 illustrates a block diagram of a software license management system, illustrated generally as license management system 300, according to one aspect of the disclosure. Portions or all of the license management system 300 can be used in association with a build-to-order system that can be ordered in a variety of ways including, but not limited to, on-line orders, phone orders, in-store or 'face-to-face' orders, or any other type of environment that can allow a user to order a build-to-order system. The user's order including the build-to-order system can then be built or manufactured within a high volume manufacturing facility and distributed to the user or entity placing the order. As such, the on-line ordering system illustrated in FIG. 3 illustrates one example of employing the licensing management system 300 and is not limited to only on-line orders.

The license management system 300 can include an on-line ordering system application 302 that can present a customer user interface 304 to enable a system to configure and order a system and associated software. The on-line ordering system application 302 can further be coupled to a system order module 306, a system restore module 308, a software updated order module 310, and a new software order module 312. One or more of the modules can be provided within the same module, or as separate modules, and can be used to present a user with various options that can be selected by a user as a user in an on-line environment.

In one form, a user may select a system restore operation of the system restore module 308 to request that software that was previously loaded and distributed to a user. For example, a user may have previously ordered a system. The portions, or all of software loaded on the system, may have become corrupt, lost, inoperable, etc. As such, the system restore module 308 can be used to initiate obtaining the previously acquired software without having to locate various software disks for reloading or reinstalling software applications, and associated licensing information to be used by the system. Additionally, the system restore 306 can be used in association with the software update order module 310 to present up-to-date software versions that can be loaded onto the previously ordered system. As such, a user need not reorder software at a full retail price and can order software applications at reduced rate when a system restore may be initiated.

In one form, the on-line ordering system application 302 can be coupled to a software license activation and installation engine 314 operable to access a license key generation module 316 and a BIOS generation module 318. The software license activation and installation engine 314 can further access a first storage device 320 that can be used to store one or more software applications and associated keys, a second storage device 322 that can be used to store customer and system information, hardware and software warranty and support information including rights to software updates, etc., a third storage device 324 operable to BIOS data or application data that can be configured for use by a specific system type. Although illustrated as being separate storage devices, one can appreciate that more than one, all, or any combination thereof can be combined into a single storage device as desired.

The software license activation and installation engine 314 can be used to enable access to or load software applications on a first IHS 326, a second IHS 328, and an n IHS 330. For example, a user can select a build-to-order IHS via the customer user interface 304. The on-line ordering system application 302 can present additional software application to order using the new software order module 312 to allow a user to request a system having preinstalled software applications and associated licensing information. Upon a user ordering a system, requesting a system restore, requesting update, requesting additional software be ordered, or any combination thereof, the on-line ordering system application 302 can communicate order information to the software license activation and installation engine 314 to initiate fulfilling the order. For example, the software license and activation and installation engine 314 can access a licensing information generation module 316 to obtain one or more license keys or licenses for a specific software application ordered. The BIOS-entry generation module 318 can generate a software enabling BIOS-entry can be used with the licensing information generation module 316 to encode licensing information to be installed within a memory of the IHS. In one form, the software license activation and installation module 316 can initiate generation of a software enabling BIOS-entry and can access license keys or licensing information from the second data source 222 storing license keys or licensing information for specific applications selected to be installed on an IHS or accessed by an IHS from a remote location. The BIOS generation module 318 can then generate a software enabling BIOS-entry to be used by a specific system having knowledge of the software applications to be installed on, or accessible to, a specific system. A record of the software ordered by a customer, and an associated system, can be stored within the third database 324 for future access as desired.

In one form, the license management system 300 can be used to enable access to software that may have been ordered for use by a diskless IHS. For example, the first IHS 326 may have been ordered as diskless system that does not include a local storage device to store software that may have been ordered for used by the diskless system. As such, the software licensing activation and installation engine 314 can maintain a record of applications that have been ordered for a specific diskless system. Additionally, a BIOS or other module loaded onto the diskless system can initiate remote access to software license activation and installation engine 314 to request a download of the software application. The license management system 300 can then enable access to the application that is remotely stored using a license key stored within the diskless system. In one form, a separate application can be used enable the diskless system access to a software application.

In one form, a user can order a software update using the online ordering system application 302. For example, the license management system 300 can maintain a copy of the software application, licensing information, a list of installed or enabled software applications, or any combination thereof. The installed or enabled software can be compared to any currently available updates and present the updates to the user for order. In this manner, an updated version of the software can be made available to be used by the end user's system. Additionally, updated licensing information, BIOS entries, software applications, or any combination thereof, can be communicated to the end user's system as desired to enable access to updated software.

In another form, the license management system 300 can include an administrator user interface 332 that can be accessed by a system administrator to maintain, update, install, enable, etc. software applications. For example, the administrator user interface 332 can be used to configure one or more IHS to be used, for example, within an enterprise or large organization. The administrator user interface 332 can initiate installation of various software applications and associated licensing information as desired. In one form, the administrator user interface 332 can be used to setup user policies. For example, different users may use the same IHS with each user having a different set of applications that can be accessed based on a user profile. The administrator user interface 332 can allow an administrator to manage which software and software licenses can be associated with each user of an IHS.

Figure 4:
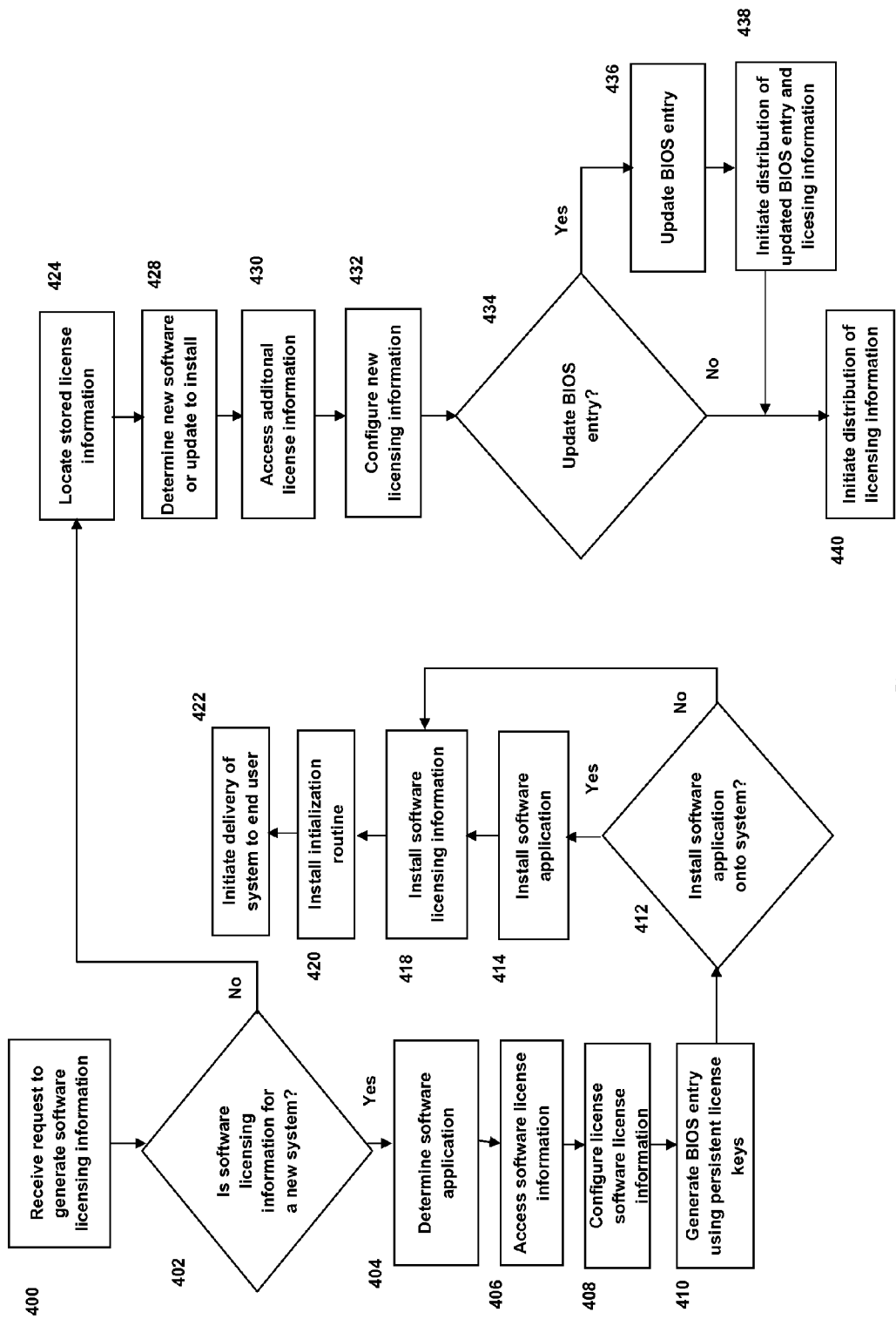
FIG. 4 illustrates a flow diagram of a method of managing licensing information according to one aspect of the disclosure.

FIG. 4 illustrates a flow diagram of a method of managing licensing information according to one aspect of the disclosure. FIG. 4 can be employed in whole, or in part, by the information handling system 100 depicted in FIG. 1, the management system 300 described in FIG. 3, or any other type of system, controller, device, module, processor, or any combination thereof, operable to employ all, or portions of, the method of FIG. 4. Additionally, the method can be embodied in various types of encoded logic including software, firmware, hardware, or other forms of digital storage mediums, computer readable mediums, or logic, or any combination thereof, operable to provide all, or portions, of the method of FIG. 4.

The method can begin generally at block 400 when a request to generate a software licensing information is received. For example, a request can input in association with ordering a new system, updating a system, restoring a system, maintaining a system, or any combination thereof. Upon receiving a request, the method can proceed to decision block 402 and determine if the licensing information is for a new system ordered. If the license is not for a new system, the method can proceed to block 424 and proceed as described below. If the software licensing information is for a new system, the method can proceed to block 404 and determine one or more software applications to load onto the new system. The method can then proceed to block 406 and licensing information to be used by a specific software application can be accessed. For example, if eight (8) software applications are to be installed onto a system, eight (8) separate licensing information specific to each application can be accessed.

The method can then proceed to block 408 and the licensing information can be configured or encoded to be installed and used on the information handling system. For example, the licensing information can include license keys having a string of characters that can be encrypted using an encryption algorithm. In other forms, the licensing information can be configured to be stored within a BIOS accessible memory location. Upon configuring the licensing information, the method can proceed to block 410 and a software enabling BIOS-entry can be generated using the software licensing information. For example, the software enabling BIOS-entry can be generated to allow access the licensing information that can be used to enable software. In one form, the software enabling BIOS-entry can include an memory address, or range of memory addresses storing the licensing information that can be used to enable access to a software application. In another form, the software enabling BIOS-entry can include a reference to a type of encryption that may have been used to encrypt the licensing information, and may access a module that can be used to decrypt the licensing information as desired.

The method can then proceed to decision block 412 and determine if the software applications should be installed onto the system. If the software application is not to be installed, the method can proceed to block 418 as described above. If one or more software applications are to be installed, the method can proceed to block 414 and one or more software applications are installed onto the system. The method can then proceed to block 418 and the software licensing information can be installed onto the system. For example, the BIOS and software licensing information can be installed within a non-volatile memory of the information handling system and in one form can be loaded into a memory device of a main circuit board, motherboard, base board, etc. of the information handling system. Upon installing, the method can proceed to block 420 and an installation routine operable to initiate validating the installed licensing information can be installed on the system. The method can then proceed to block 422 and initiates delivery of the system to the user. In this manner, a user can obtain one or more software applications during an order of a system, and the software and associated licensing information can be stored within a system prior to shipping to a user. In this manner, the need for a user to have to manually enter licensing keys for various software applications can be obviated.

If at decision block 402, if software is not being ordered for a new system, the method can proceed to block 424 and stored licensing information can be located. For example, licensing information for a user's system can be stored within a remote database and accessed to determine what software applications may have been previously ordered, distributed, or enabled. The method can then proceed to block 428 and determines what new software has been selected to be enabled on the information handling system. In one form, a user may have selected an update to be installed on a system. In another form, the method can determine if there are any updates available to be installed for the previously ordered software application. The method can then proceed to block 430 and accesses additional licensing information for the new software application or updates. The method can then proceed to block 432 and the new licensing information can be configured to be used at the end user's system. For example, the new licensing information can be formatted into a format that can be used by the end system. In one form, the new licensing information and the previously distributed licensing information can be configured together.

The method can then proceed to decision block 434, and if a BIOS entry for the end system should be updated, the method can proceed to block 436. At block 436, the BIOS entry can be update. The method can then proceed to block 438 and initiates distribution the updated BIOS entry and licensing information to the end system. If at decision block 434, the BIOS need not be updated, the method can proceed to block 440 and initiates distribution of the licensing information to the end user's system.

Figure 5:
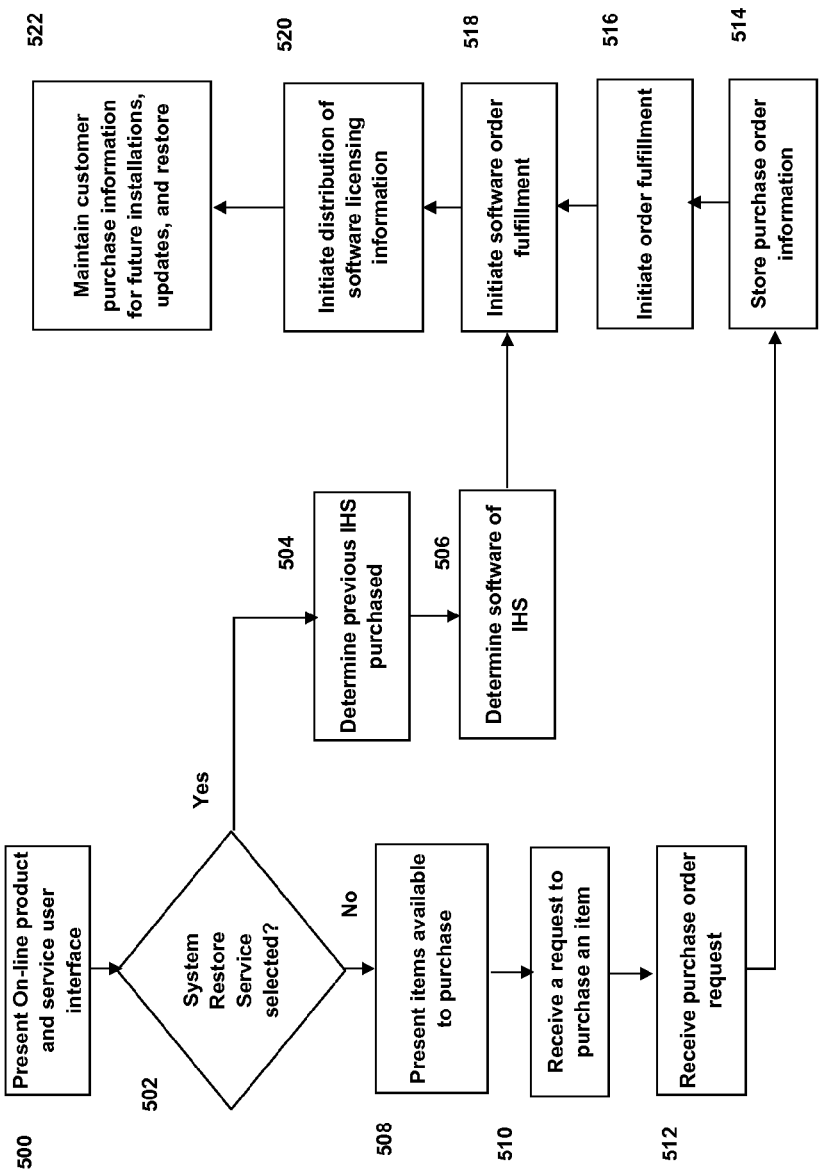
FIG. 5 illustrates a flow diagram of a method of selling and distributing software according to one aspect of the disclosure.

FIG. 5 illustrates a flow diagram of a method to manufacture and distribute software according to one aspect of the disclosure. FIG. 5 can be employed in whole, or in part, by the information handling system 100 depicted in FIG. 1, the management system 300 described in FIG. 3, or any other type of system, controller, device, module, processor, or any combination thereof, operable to employ all, or portions of, the method of FIG. 5. Additionally, the method can be embodied in various types of encoded logic including software, firmware, hardware, or other forms of digital storage mediums, computer readable mediums, or logic, or any combination thereof, operable to provide all, or portions, of the method of FIG. 5. The method of FIG. 5 can be incorporated, in whole or in part, as a business method, software method, or any other type of method that can be realized by the method of FIG. 5.

The method begins generally at bock 500 as an on-line product and service user interface is presented to a user for selecting a product or service. For example, a user can be presented with an option to order a new system, add software to an existing system, order updates for previously ordered software, restore previously ordered software, or various other products or services that can be used in association with accessing or maintaining software applications. For example, at decision block 502, a user can select a system restore service to restore access to previously ordered software. If at decision block 502, a user has selected a system restore service, the method can proceed to block 504 and determines the IHS that was previously ordered. For example, a user may have ordered a laptop system that was previously enabled, either through an initial installation, or possibly through subsequent orders, to access or load various software applications on the end user's IHS. As such, a user may desire to reinstall or restore access to the previously ordered software. In some forms, the system restore software service can be provided at no cost to an end user however, in other embodiments, a user may pay a fixed fee to restore the system. Upon determining a previously ordered system and software applications, the method can proceed to block 524 and initiates a software order fulfillment using the previously ordered software as described below. In this manner, a user can restore a system to an operating state using previously ordered software without having to locate various software applications and associated installation licenses or keys.

If at decision block 502, a system restore service is not selected, the method can proceed to block 508, and various types of software, can be presented to a user to order. For example, a user may have previously ordered a build-to-order system. As such, a user may have configured a system that can employ specific types of software that can be presented to a user to order. At block 510, a request to order one or more items can be detected. For example, a user can select one or more software applications, software updates, or any combination thereof. At block 512, an order can be received, and at block 514, the order information can be stored within a database of storing orders. The method can then proceed to block 516 and initiate an order fulfillment to fulfill the order. For example, a purchase order can be fulfilled by a software management and installation application operable to configure enablement of a software application or an update to be used by a specific system. In other forms, the order can include items, other than software that may have been ordered. As such, the initiation of the order fulfillment can include fulfilling an order including various types of products. In another form, the order fulfillment can include manufacturing a build-to-order system and the licensing information can be encoded within a persistent memory device, such as an NVRAM, ROM, EEPROM, etc. as a part of the manufacturing process. Additionally, a build-to-order system can include updating an associated BIOS of the build-to-order system to include a reference, licensing information, licensing keys, etc. to each licensed application enabled to be used by the build-to-order system.

The method can then proceed to block 518 and determines what software or updated have been ordered. For example, various types of software applications can be ordered including operating systems, component drivers, browser applications, business applications, media software, or various other types of applications. Additionally, the software licensing information to be used in association with the various applications can be configured as described above prior to, during, or after initiating the order fulfillment. The method can then proceed to block 520, and distribution of the software licensing information to the end user can be initiated. In one form, the method can include distributing the software application, an updated BIOS entry, in addition to, or in combination with, the software licensing information. The method can then proceed to block 522, and the customer purchase information can be maintained within a database to future installations, updates, restorations, etc. as desired.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method of enabling use of a software application comprising:
    enabling access to a first software licensing information of a first software application
        within a non-volatile memory of an information handling system, the first licensing information stored in association with an order fulfillment process, wherein the order fulfillment process includes downloading the first software application via an on-line user interface and installing the first software application;
        storing an initialization routine in association with a BIOS of the information handling system, the initialization routine operable to initiate accessing the software licensing information from the non-volatile memory to enable use of the first software application;
    receiving a request to obtain the information handling system;
    receiving a request to license the first software application to be used by the ordered information handling system;
        initiating an encoding of the software licensing information to access the first software application using the ordered information handling system;
        initiating loading the encoded software license information into the non-volatile memory of the information handling system during manufacture of the information handling system; and
        initiating delivery of the information handling system to a user.

2. The method of claim 1, further comprising: receiving a request to order a second software application to be used by the information handling system, the second software application including a second licensing information;
    initiating an update of the non-volatile memory to include the second licensing information;
    and initiating communication of the second licensing information to the user to update the non-volatile memory of the ordered information handling system.

3. The method of claim 2, further comprising:
    distributing the second licensing information at the ordered information handling system;
    enabling an update of the non-volatile memory of the information handling system with the distribution, the update including storing the first licensing information and the second licensing information within the non-volatile memory, the update operable to:
    validate the second software application using the second licensing information during an initialization; and
    enable use of the second software application in response to the validating.

4. The method of claim 2, further comprising: receiving a request to restore the first software application;
    determining an identifier of the ordered information handling system;
    determining the first software licensing information of the ordered information handling system; and
    initiating communication of the first software licensing information to restore access to the first software application.

5. The method of claim 4, further comprising:
    determining a plurality of software applications previously licensed by the user to be used by the ordered information handling system;
    determining a plurality of software licensing information to enable use of each of the plurality of software applications; and
    initiating communication of the plurality of software licensing information to restore access to the plurality of software applications.

6. The method of claim 1, further comprising:
    installing the software licensing information as a software enabling BIOS-entry within the non-volatile memory; and
    enabling access to the software enabling BIOS-entry using a BIOS of the information handling system during execution of the initialization routine.

7. The method of claim 1, further comprising:
    identifying a remote location storing the first software application;
    receiving a request to access to the first software application using the information handling system, wherein the information handling system includes a diskless information handling system; and
    sending the first software application from the remote location to the diskless information handling system.

8. The method of claim 7, further comprising:
    receiving a communication of the first software licensing information at the remote location; and
    enabling access to the first software application in response to validating the first software licensing information at the remote location.

9. The method of claim 1, further comprising:
    enabling a partitioned storage device to use during use of the initialization routine;
    storing the first software application within the partitioned storage device;
    enabling use of a virtual machine operable to access an operating system in association with the partitioned storage device;
    storing the first software licensing information;

enabling access to the operating system using the virtual machine; and
    enabling access to the first software application stored within the partitioned storage device using the first software licensing information.

10. The method of claim 1, further comprising:
enabling an initializing of the information handling system using a first initialization, the first initialization operable to:
    access the first software licensing information associated with the first software application;
    validate the first software licensing information; and
enable use of the first software application in response to validating; and
enabling an initialization of the information handling system a second time after receiving an update including a second software licensing information, the second initialization operable to:
    detect an availability of the update;
    enable access to the first software application using the first licensing information;
    determine a second software licensing information operably associated with the update;
validate the second software licensing information; and
    enable use of the second software application in response to validating the second software licensing information.

11. The method of claim 1, comprising:
receiving a request to order a diskless information handling system;
presenting at least one software application available to be licensed and used by the diskless information handling system;
receiving a request to order the at least one software application;
encoding a software licensing information to enable access to the at least one software application stored at a remote location;
loading the encoded software licensing information into a BIOS accessible memory of the diskless information handling system; and
initiating distribution of the diskless information handling system including the encoded software licensing information.

12. An information handling system comprising:
a non-volatile memory device storing a software licensing information in response to a user ordering a first software application using an on-line user interface;
an initialization routine operable to access the non-volatile memory device during a system initialization, the initialization routine further operable to initiate a verification of the first licensing information to enable access to the first software application;
wherein an order fulfillment process including downloading the first software application via an on-line user interface and installing the first software application;
receiving a request to obtain the information handling system;
receiving a request to license the first software application to be used by the ordered information handling system;
    initiating an encoding of the software licensing information to access the first software application using the ordered information handling system; and
    initiating loading the encoded software license information into the non-volatile memory of the information handling system during manufacture of the information handling system; and
initiating delivery of the information handling system to a user.

13. The information handling system of claim 12, further comprising:
a software license detection module operably associated with a BIOS and the initialization routine, the software license detection module operable to detect at least one software enabling BIOS-entry stored within the non-volatile memory;
a virtual machine operably associated with at least one operating system, the virtual machine further operable to enable access to the at least one operating system;
wherein the software license detection module is further operable to read the at least one software enabling BIOS-entry to determine the first software licensing information; and
wherein the software licensing detection module is further operable to enable access to the first software application using the first software licensing information.

14. The information handling system of claim 12, further comprising a main circuit board including the non-volatile memory storing a software licensing key loaded during a manufacturing process.

15. The information handling system of claim 12, further comprising:
a diskless operating environment operable to access the first software application stored at a remote location;
    a communication module operable to receive the first software application from the remote location upon validating the first licensing information; and
    a memory operable to temporarily store the first software application received from the remote location upon validating the first licensing information.

16. A software management system comprising:
an on-line user interface operable to enable a user to select a first software application to order; and
a software management licensing engine operable to receive a request to enable access to the first software application ordered using the on-line user interface, the access enabled by initiating a loading into a non-volatile memory of an information handling system a first software licensing information of the first software application;
wherein an order fulfillment process including downloading the first software application via an on-line user interface and installing the first software application;
receiving a request to obtain the information handling system;
receiving a request to license the first software application to be used by the ordered information handling system;
initiating an encoding of the software licensing information to access the first software application using the ordered information handling system; and
initiating loading the encoded software license information into the non-volatile memory of the information handling system during manufacture of the information handling system; and
initiating delivery of the information handling system to a user.

17. The software management system of claim 16, further comprising a software installation engine operable to communicate the first software application to a diskless information handling system remotely located from the software installation engine.

18. The software management system of claim 17, further comprising a database storing:

an information handling system identifier of at least one information handling system; and at least one reference to at least one software application enabled within the at least one information handling system using at least one software licensing information.

19. The software management system of claim 16, further comprising:

an update module operable to enable a user to select additional software applications to order using the on-line user interface; and a system restore module operable to enable the user to restore access to the first software application.

* * * * *